(12) United States Patent
Ash et al.

(10) Patent No.: US 8,825,975 B2
(45) Date of Patent: *Sep. 2, 2014

(54) CACHING SOURCE BLOCKS OF DATA FOR TARGET BLOCKS OF DATA

(71) Applicant: International Business Machines Corporation, Armonk, NY (US)

(72) Inventors: Kevin J. Ash, Tucson, AZ (US); Michael T. Benhase, Tucson, AZ (US); Lokesh M. Gupta, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,795

(22) Filed: Feb. 22, 2013

(65) Prior Publication Data

US 2013/0185510 A1    Jul. 18, 2013

Related U.S. Application Data

(63) Continuation of application No. 13/352,201, filed on Jan. 17, 2012.

(51) Int. Cl.
*G06F 12/08* (2006.01)

(52) U.S. Cl.
USPC .......................................... 711/162; 711/118

(58) Field of Classification Search
None
See application file for complete search history.

(56) References Cited

U.S. PATENT DOCUMENTS

| 6,611,901 | B1 * | 8/2003 | Micka et al. ................ 711/162 |
| 7,055,009 | B2 | 5/2006 | Factor et al. |
| 7,124,128 | B2 | 10/2006 | Springer, Sr. et al. |
| 8,359,491 | B1 * | 1/2013 | Bloomstein .................. 714/6.3 |
| 2003/0140204 | A1 * | 7/2003 | Ashton et al. ................ 711/162 |
| 2004/0080558 | A1 * | 4/2004 | Blumenau et al. ............. 347/19 |
| 2004/0260869 | A1 * | 12/2004 | Factor et al. ................. 711/112 |
| 2005/0278391 | A1 * | 12/2005 | Spear et al. .................. 707/201 |
| 2006/0195493 | A1 * | 8/2006 | Chang et al. ................. 707/204 |
| 2013/0185501 | A1 | 7/2013 | Ash et al. |

OTHER PUBLICATIONS

Office Action dated Oct. 10, 2013, pp. 29, for filed Feb. 22, 2013 U.S. Appl. No. 13/352,201, filed Jan. 1, 2012.

(Continued)

*Primary Examiner* — Charles Rones
*Assistant Examiner* — Tian-Pong Chang
(74) *Attorney, Agent, or Firm* — Janaki K. Davda; Konrad Raynes Davda & Victor LLP

(57) ABSTRACT

Provided is a method for processing a read operation for a target block of data. A read operation for the target block of data in target storage is received, wherein the target block of data is in an instant virtual copy relationship with a source block of data in source storage. It is determined that the target block of data in the target storage is not consistent with the source block of data in the source storage. The source block of data is retrieved. The data in the source block of data in the cache is synthesized to make the data appear to be retrieved from the target storage. The target block of data is marked as read from the source storage. In response to the read operation completing, the target block of data that was read from the source storage is demoted.

7 Claims, 7 Drawing Sheets

(56) References Cited

OTHER PUBLICATIONS

Response dated Jan. 10, 2014, pp. 10, to Office Action dated Oct. 10, 2013, pp. 29, for filed Feb. 22, 2013 U.S. Appl. No. 13/352,201, filed Jan. 1, 2012.

Preliminary Amend filed Feb. 22, 2013 U.S. Appl. No. 13/352,201, filed Jan. 1, 2012.

Notice of Allowance dated Apr. 25, 2014, pp. 12, for U.S. Appl. No. 13/352,201, filed Jan. 17, 2012.

* cited by examiner

CACHING SOURCE BLOCKS OF DATA FOR TARGET BLOCKS OF DATA

CROSS-REFERENCE TO RELATED APPLICATION

This patent application is a continuation of U.S. patent application Ser. No. 13/352,201, filed Jan. 17, 2012, which patent application is incorporated herein by reference in its entirety.

BACKGROUND OF THE INVENTION

1. Field of the Invention

The present invention relates to a computer program product, system, and method for caching source blocks of data (e.g., tracks) for target blocks of data (e.g., tracks) for which data has not yet been copied from corresponding source blocks of data.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Some disaster recovery systems address data loss over a period of time, in which case writes to volumes on data storage may be lost. The writes may update data, write new data, or write the same data again. To assist in recovery of data writes, a copy of data may be provided at a remote location. Such copies may also be referred to as dual or shadow copies.

Remote mirroring systems provide techniques for mirroring data in order to facilitate recovery after a system failure. Such data shadowing systems can also provide an additional remote copy for non-recovery purposes, such as local access at a remote site.

In remote mirroring systems, data is maintained in volume pairs. A volume pair is comprised of a volume in a source (or "primary") storage device and a corresponding volume in a target (or "secondary") storage device that includes a copy of the data maintained in the source volume.

A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

Instant virtual copy operations work by modifying metadata in structures, such as relationship tables or pointers, to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. (FlashCopy is a trademark or common law mark of International Business Machines Corporation in the United States and/or other countries.) A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source storage have been physically copied to the target storage or when a FlashCopy® withdraw command is received. A FlashCopy® withdraw command may be described as a command to end a FlashCopy® relationship. In certain cases, even though all tracks have been copied from the source storage to the target storage, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set (e.g., either logically or physically) when the corresponding track is established as a target track of a FlashCopy® relationship. The target bit is reset when the corresponding track has been copied from the source location and destaged to the target device due to writes on the source or the target device, or a background copy task.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

When a target track is to be read, the target track may need to be staged from the source storage if the target track has not been copied to the target storage since the instant virtual copy was established. Some systems cache the target track. So, on a subsequent read on the target track, the target track is a hit (i.e., is found in the cache).

However, on a FlashCopy® withdraw, such target tracks in the cache need to be discarded, since these tracks do not have data copied from the source storage to the target storage and the metadata on disk for the FlashCopy® does not match the target track in the cache.

Also, there can be multiple target storages for a source storage. For reads on those target storages, multiple copies of a source track may be cached as separate target tracks for each target storage.

Conventional systems perform a read operation for a target track in a FlashCopy® relationship in the following manner:
1. Host issues read operation to target storage
2. Stage source data to cache (i.e., make a new copy of the source data)
3. Synthesize the source data to make it appear to be coming from target storage
4. Rebuild the Track Format Descriptor (TFD)/Record Zero Data Table (R0DT)(Count Key Descriptor (CKD)) to match data in the cache from the source storage Then, on a FlashCopy® withdraw, the following operations are performed:
5. Scan entire cache and discard data staged from the source (in operation #2 above)
6. Scan entire volume to invalidate the TFD/R0DT (from operation #4 above)

Notwithstanding existing instant virtual copy operations, there is a need for an improved instant virtual copy operation.

SUMMARY

Provided are a computer program product, system, and method for processing a read operation for a target block of data. A read operation for the target block of data in target storage is received, wherein the target block of data is in an instant virtual copy relationship with a source block of data in source storage. It is determined that the target block of data in the target storage is not consistent with the source block of data in the source storage. The source block of data is retrieved. The data in the source block of data in the cache is synthesized to make the data appear to be retrieved from the target storage. The target block of data is marked as read from the source storage. In response to the read operation completing, the target block of data that was read from the source storage is demoted.

BRIEF DESCRIPTION OF THE DRAWINGS

FIG. 3 is formed by FIG. 3A, FIG. 3B, and FIG. 3C.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For a target block of data that is re-directed to a corresponding source block of data for a read operation, embodiments cache the source block of data in the cache and remove the target block of data from the cache once the read operation is complete.

Figure 1:
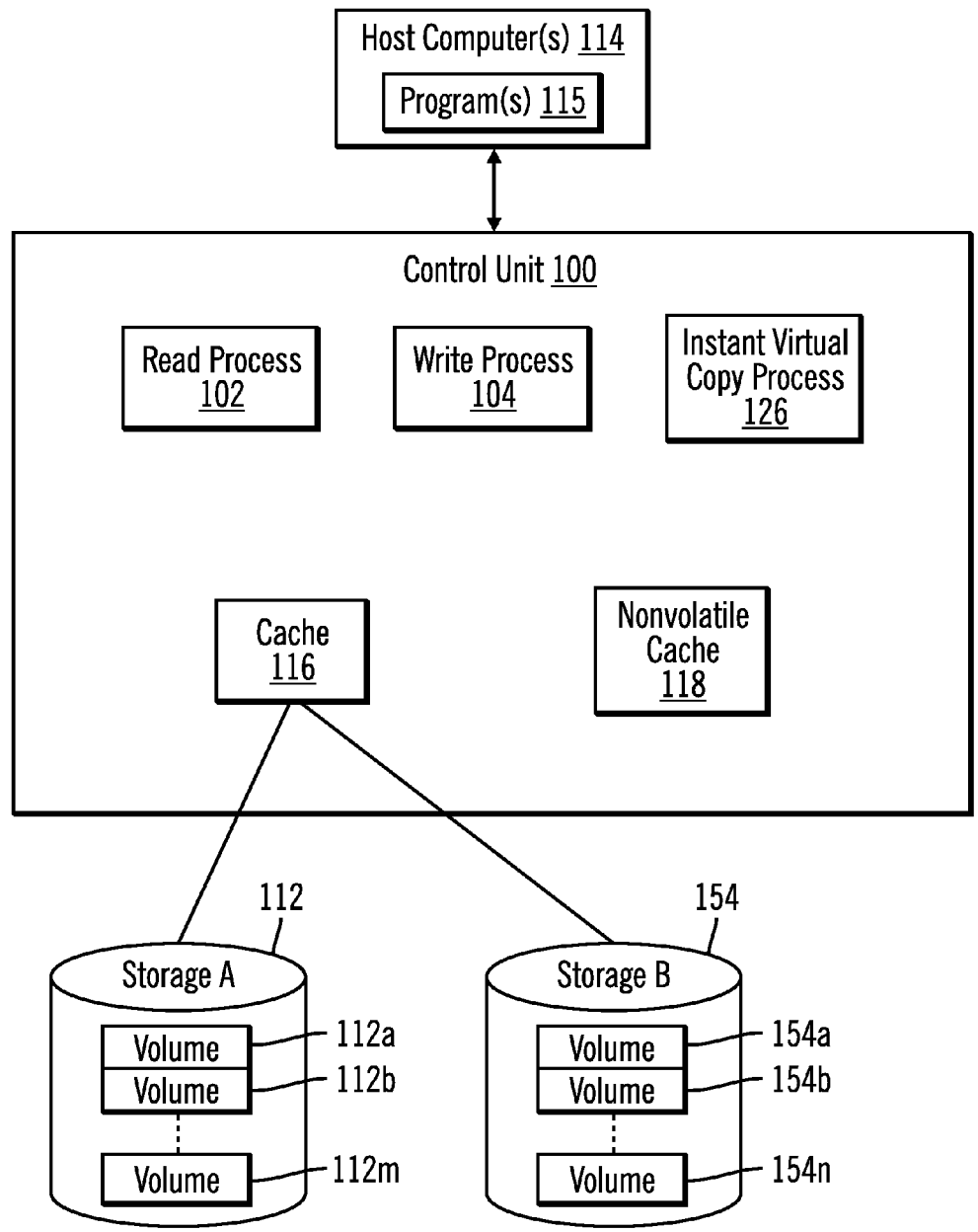
FIG. 1 illustrates, in a block diagram, a computing environment in accordance with certain embodiments of the invention.

FIG. 1 illustrates, in a block diagram, a computing environment in accordance with certain embodiments of the invention. A control unit 100 provides one or more host computers 114 access to storage A 112 and storage B 154. The host computers 114 may each execute one or more programs 115 under control of an operating system (not shown) and executing on a processor (not shown). The control unit 100 receives Input/Output (I/O) requests from one or more programs 115 at one or more host computers 114 (e.g., over a network) directed toward storage A 112 and storage B 154. Storage A 112 is configured to have volumes (e.g., Logical Unit Numbers, Logical Devices, etc.) 112a,b, . . . m, where m represents that there may be any number of volumes. Storage B is configured to have volumes (e.g., Logical Unit Numbers, Logical Devices, etc.) 154a,b, . . . n, where n represents that there may be any number of volumes Storage B 154 maintains copies of all or a subset of the volumes 112a,b . . . m of the storage A 112. Additionally, storage B 154 may be updated by, for example, one or more programs 115 at one or more host computers 114. A volume may be any logical or physical element of storage.

Figure 2:
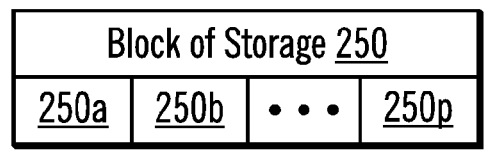
FIG. 2 illustrates blocks of storage in accordance with certain embodiments of the invention.

FIG. 2 illustrates blocks of storage in accordance with certain embodiments of the invention. The storage A 112 and storage B 154 may each be divided into blocks of storage 250 (FIG. 2) containing blocks of data, and the blocks of storage 250 are further divided into sub-blocks of storage (250a . . . 250p, where p represents that there may be any number of sub-blocks) that contain sub-blocks of data. In certain embodiments, the blocks of data are contents of tracks, while the sub-blocks of data are contents of sectors of tracks.

The control unit 100 includes a cache 116 in which updates to blocks of data in the storage A 112 may be maintained until written to storage A 112 (i.e., the blocks of data are destaged) and in which updates to blocks of data in the storage B 154 may be maintained until written to storage B 154 (i.e., the blocks of data are destaged). The cache 116 may be used to buffer read and write data being transmitted between the hosts 114 and storage 112, 154. Further, cache 116 may be referred to as a source cache for holding source blocks of data or as a target cache for holding target blocks of data in a point-in-time copy relationship (e.g., an instant virtual copy relationship). Moreover, the cache 116 may store at the same time source and target blocks of data in different point-in-copy relationships.

Additionally, the control unit 100 includes a nonvolatile cache 118. The non-volatile cache 118 may be, for example, a battery-backed up volatile memory, to maintain a non-volatile copy of data updates and other information.

The control unit 100 includes a read process 102 for reading data, a write process 104 for writing data, and an instant virtual copy process 126. When an instant virtual copy operation is being performed between two storages, the two storages may be said to be in an "instant virtual copy relationship", which is a type of point-in-time copy relationship.

In certain embodiments, removable storage may be used to maintain back-up copies of all or a subset of the storage A 112, and the techniques of the invention transfer data to the removable storage rather than to the remote storage. The removable storage may reside at the control unit 100.

A primary site may include multiple control units, storage, and host computers. A secondary site may include multiple second control units, recovery systems, and storage.

In certain embodiments of the invention, data is maintained in volume pairs. A volume pair is comprised of a first volume in a first storage device (e.g., storage A 112) and a corresponding volume in a second storage device (e.g., storage B 154) that includes a consistent copy of the data maintained in the first volume. For example, volume 112a at storage A 112 may correspond to volume 154a at storage B 154.

For storage 112, 154 the values of m and n may be the same or different. The storage 112, 154 may each comprise an array of storage devices, such as Direct Access Storage Devices (DASDs), Just a Bunch of Disks (JBOD), Redundant Array of Independent Disks (RAID), virtualization device, etc.

For ease of reference, the terms tracks and sectors may be used herein as examples of blocks of data and sub-blocks of data, but use of these terms is not meant to limit the technique of the invention to tracks and sectors. The techniques of the invention are applicable to any type of storage, block of storage or block of data divided in any manner.

Embodiments of the invention are applicable to the transfer of data between any two storage mediums, which for ease of reference may be referred to herein as source storage and target storage or as first storage and second storage. For example, certain embodiments of the invention may be used with two storage mediums located at a single storage controller 110, as illustrated in FIG. 1. Moreover, certain alternative embodiments of the invention may be used with two storage mediums located at different storage controllers, different physical sites, etc. Also, for ease of reference, a block of data in source storage may be referred to as a "source block of data," and a block of data in target storage may be referred to as a "target block of data."

When the indication of which storage is to be a source and which storage is to be a target is reversed, for ease of reference, the "original source" may be referred to as a "new target", the "original target" may be referred to as a "new source", an "original source block of data" may be referred to as a "new target block of data," and an "original target block of data" may be referred to as a "new source block of data."

Figure 3A:
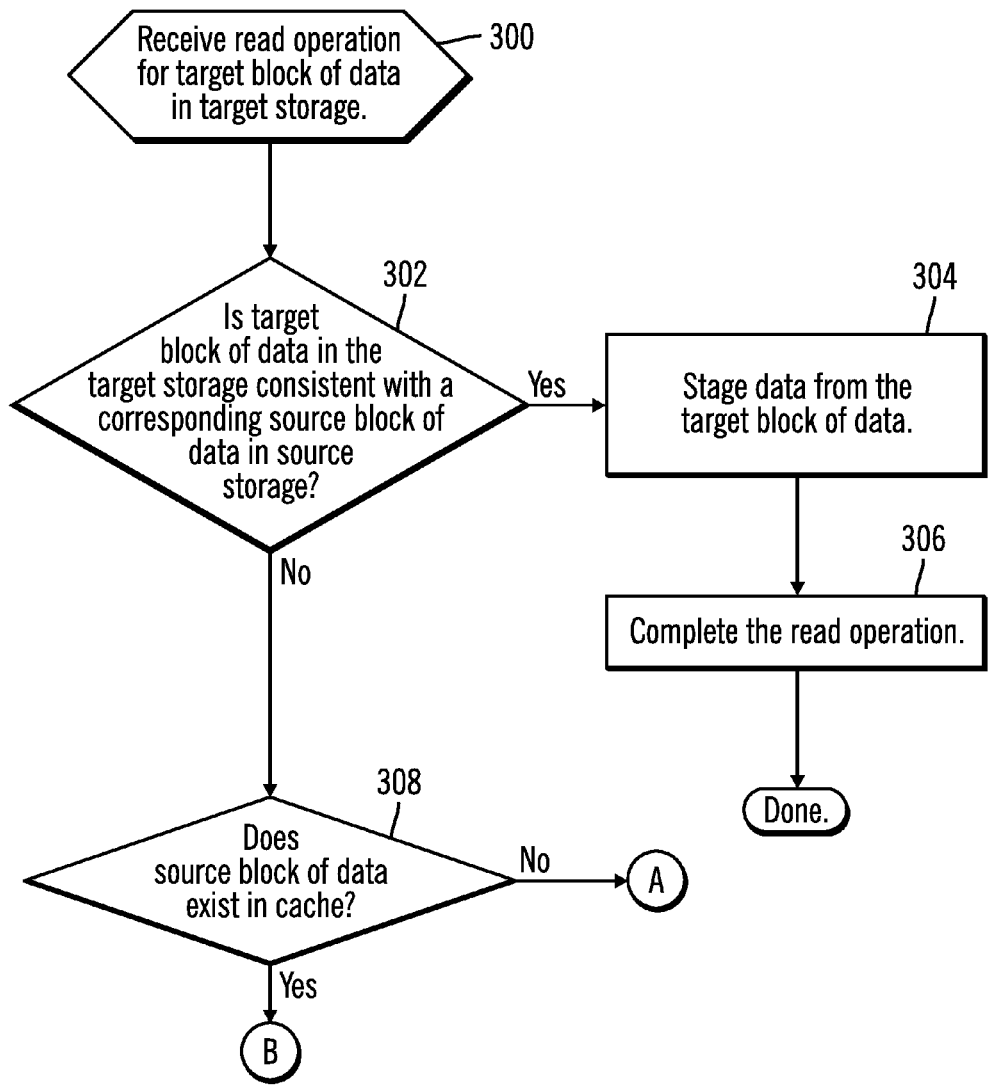
FIG. 3 illustrates, in a flow diagram, operations for caching a source block of data for a target block of data in accordance with certain embodiments.
Figure 3B:
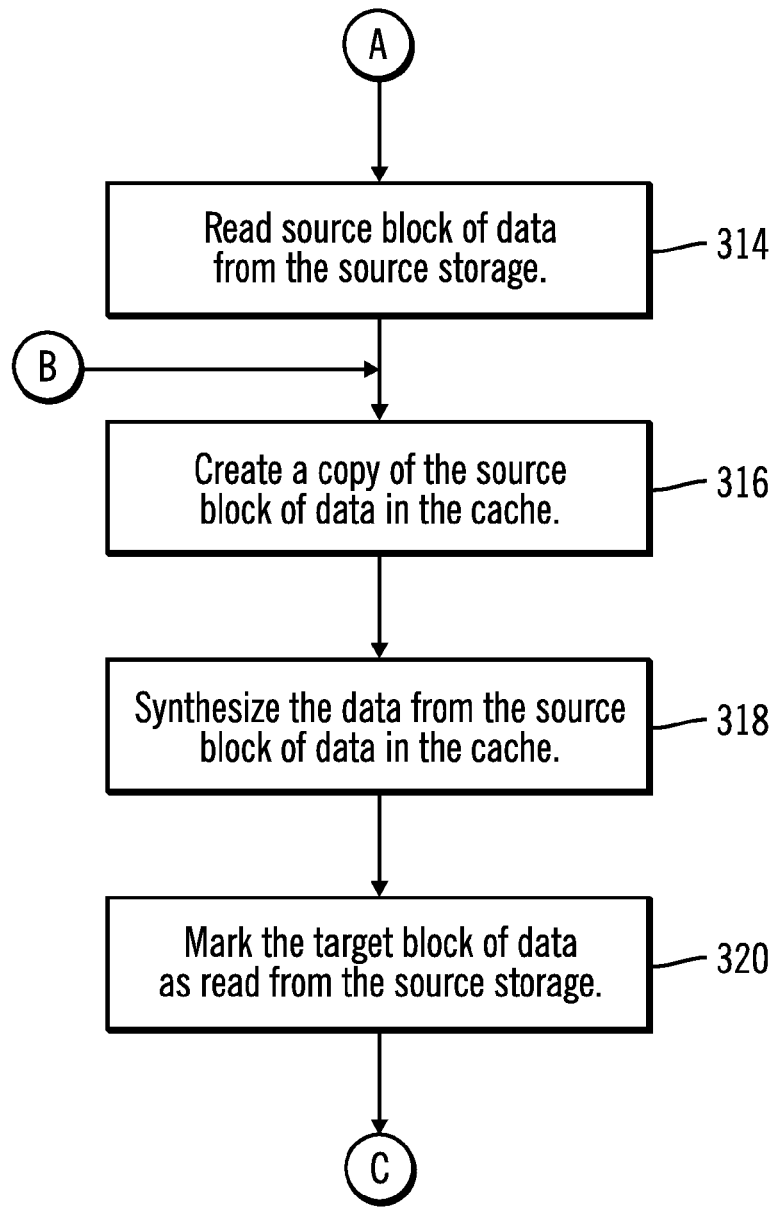
Figure 3C:
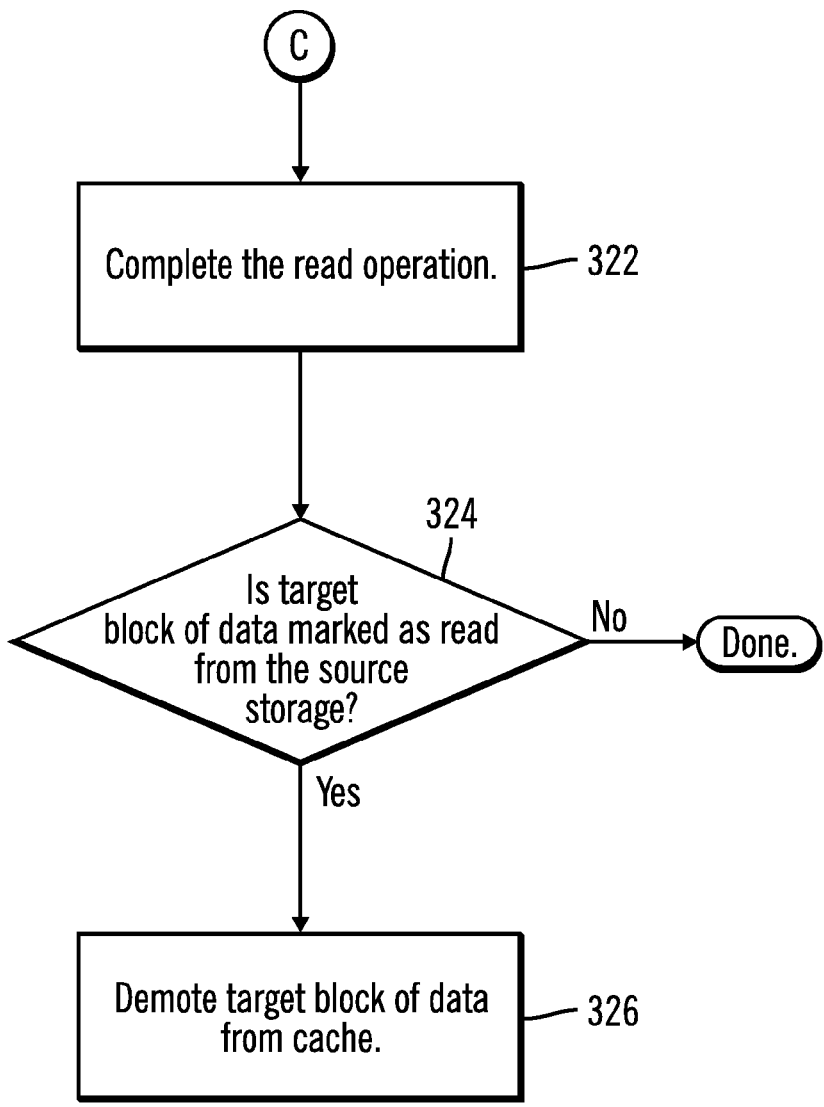

FIG. 3 illustrates, in a flow diagram, operations for caching a source block of data for a target block of data in accordance with certain embodiments. FIG. 3 is formed by FIG. 3A, FIG. 3B, and FIG. 3C.

Control begins at block 300 with the instant virtual copy process 126 receiving a read operation from a host computer 114 for a target block of data in target storage. In block 302, the instant virtual copy process 126 determines whether the target block of data in the target storage is consistent with a corresponding source block of data in the source storage. In certain embodiments, the determination is made by checking an indicator in a relationship table for the instant virtual copy relationship to determine whether the data for the source block of data has already been copied to the target block of data. That is, the instant virtual copy process 126 determines whether the target block of data needs to be read from the source storage. In certain embodiments, the target block of data needs to be read from the source storage when the corresponding source block of data has not yet been copied from the source storage to the target storage.

If the target block of data is consistent, processing continues to block 304, otherwise, processing continues to block 308. That is, if the target block of data needs to be read from the source storage, the instant virtual copy process 126 re-directs the read operation to the source storage by continuing processing to block 308.

In block 304, the instant virtual copy process 126 stages data from the target block of data. In block 306, the instant virtual copy process 126 completes the read operation (e.g., by returning data to the host requesting the target block of data). Then, processing is done.

In block 308, the instant virtual copy process 126 determines whether the source block of data exists in the cache 116. If so, processing continues to block 318 (FIG. 3B), otherwise, processing continues to block 314 (FIG. 3B).

In block 314, the instant virtual copy process 126 reads the source block of data from the source storage. In block 316, the instant virtual copy process 126 creates a copy of the source block of data that has just been read in the cache 116. In block 318, the instant virtual copy process 126 synthesizes data from the source block of data in the cache 116. In block 320, the instant virtual copy process 126 marks the target block of data as read from the source storage. From block 320 (FIG. 3B), processing continues to block 322 (FIG. 3C).

Synthesizing the data may be described as making the data from the source block of data appear to be from the target storage. In certain embodiments, each block of data has a sequence number, and the instant virtual copy process 126 synthesizes the sequence number. The sequence number is also referred to as a Logical Block Address and may be used to check bytes on the data. The sequence number is synthesized so that a host adapter check/strip does not signal a false error.

In block 322, the instant virtual copy process 126 completes the read operation (e.g., by returning data to the host requesting the target block of data). When the read operation is complete, the client ends access to the target storage.

In block 324, the instant virtual copy process 126 determines whether the target block of data was read from the source storage (e.g., based on the marking discussed in block 320). If so, processing continues to block 326, otherwise, processing is done. In block 326, the instant virtual copy process 126 demotes the target block of data from the cache 116 to the target storage. In certain embodiments, demoting a target block of data comprises removing that target block of data from the cache 116.

Figure 4:
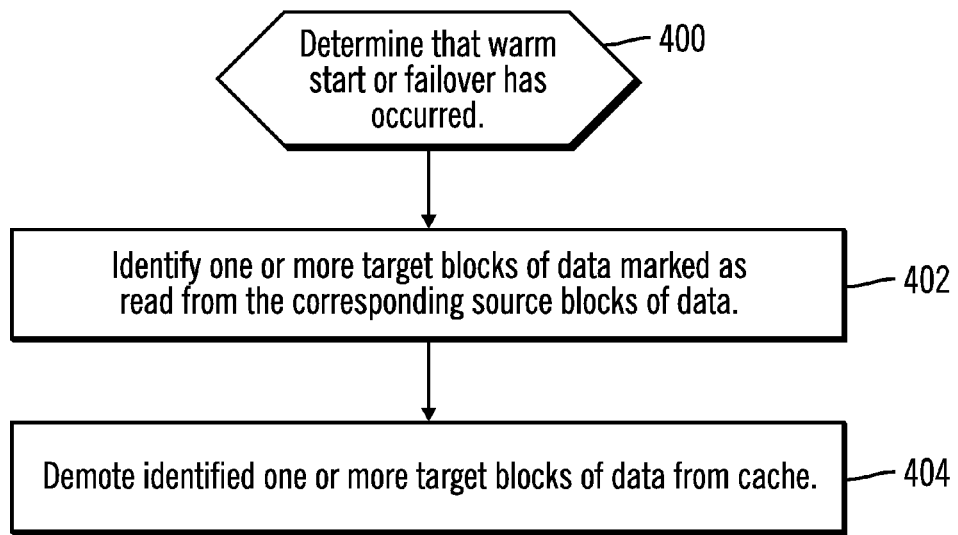
FIG. 4 illustrates, in a flow diagram, processing in case of warm start or failover in accordance with certain embodiments.

FIG. 4 illustrates, in a flow diagram, processing in case of warm start or failover in accordance with certain embodiments. A warm start may be described as resuming operations in a computing environment, following a problem-generated shutdown, in which programs that had been running can resume at the point at which they were running when the shutdown occurred. For a failover, when a first system is unable to continue processing, a second system takes over the processing.

Control begins at block 400 with the instant virtual copy process 126 determining that warm start or failover has occurred. In block 402, the instant virtual copy process 126 identifies one or more target blocks of data marked as read from the corresponding source blocks of data. In block 404, the instant virtual copy process 126 demotes the one or more target blocks of data in the cache 116 that have been marked as read from the source storage.

Embodiments cache source blocks of data instead of target blocks of data. That is, source blocks of data are cached for target blocks of data that have not been copied (i.e., updated) from the corresponding source blocks of data and read requests are redirected towards the cached source blocks of data.

In particular, a read request is received for a target block of data that has not been copied (i.e., updated) from a source volume to a target volume. A source block of data (corresponding to the target block of data) is cached and characterized as a target block of data in the target volume. The read request for the target block of data is redirected to the cached source block of data, and the target block of data is demoted from the cache to the target volume once the read request completes.

Thus, with embodiments, there is no need to discard target blocks of data from the cache 116 on an instant virtual copy withdraw. Also, embodiments reduce the footprint in the cache 116 for multiple target blocks of data that need the same copy of the source block of data.

Thus, embodiments perform a read operation for a target block of data in an instant virtual copy relationship in the following manner:

1. Host issues read operation to target storage
2. Stage source data to cache (i.e., make a new copy of the source data), if needed
3. Synthesize the source data to make it appear to be coming from target storage (i.e., give source LBA to host adapter for check/strip to prevent signal of false error)

With embodiments, there is no need to rebuild a Track Format Descriptor (TFD)/Record Zero Data Table (R0DT) (Count Key Descriptor (CKD)) to match data in the cache from the source storage Also, for an instant virtual copy withdraw operation, there is no need to scan the cache 116 and discard target blocks of data staged from the source storage or to scan the volume to invalidate the TFD/R0DT.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3-4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 5:
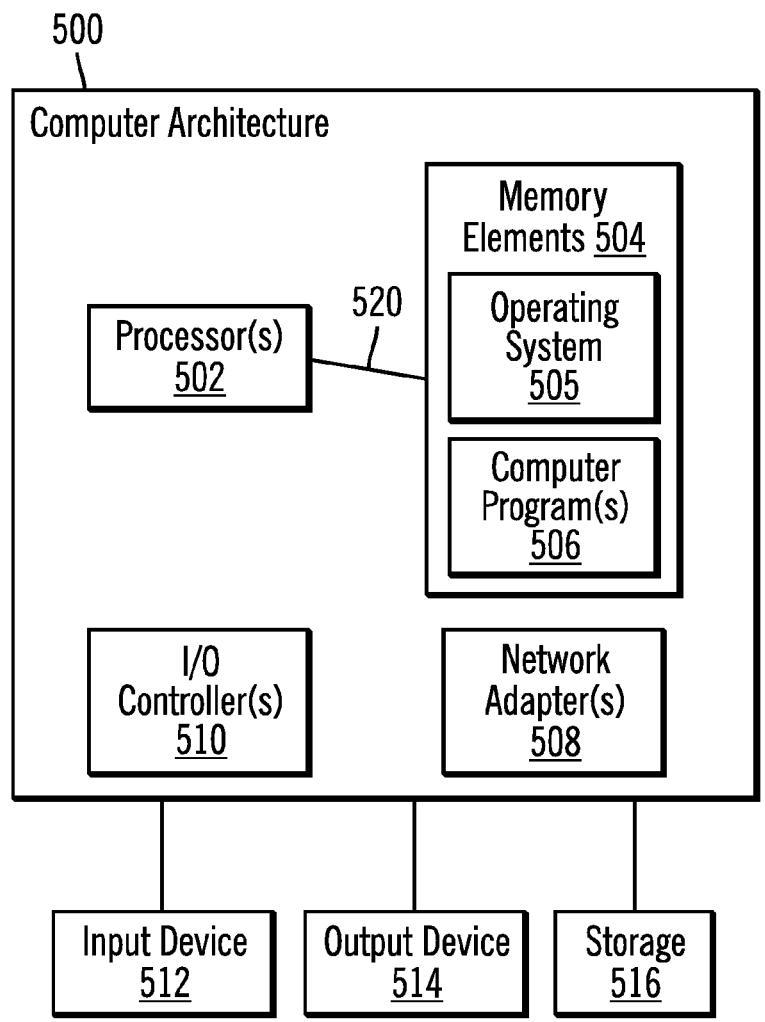
FIG. 5 illustrates a computer architecture that may be used in accordance with certain embodiments.

FIG. 5 illustrates a computer architecture 500 that may be used in accordance with certain embodiments. Host computers 114 and/or control unit 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible embodiments of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for processing a read operation for a target block of data, comprising:

receiving, using a processor of a computer, the read operation for the target block of data in target storage, wherein the target block of data is in an instant virtual copy relationship with a source block of data in the source storage;

determining that the target block of data in the target storage is not consistent with the source block of data in the source storage;

retrieving the source block of data;

synthesizing data in the source block of data in a cache to make the data appear to be retrieved from the target storage;
marking the target block of data as read from the source storage;
in response to the read operation completing, demoting the target block of data that was read from the source storage; and
in response to receiving a withdraw command that ends the instant virtual copy relationship, ending the instant virtual copy relationship without scanning the cache and discarding target blocks of data staged from the source storage.

2. The method of claim 1, further comprising:
determining that the target block of data in the target storage is consistent with the corresponding source block of data in the source storage;
reading the target block of data from the target storage; and
completing the read operation.

3. The method of claim 1, further comprising:
determining that the source block of data exists in the cache, wherein the source block of data is retrieved from the cache.

4. The method of claim 1, further comprising:
determining that the source block of data does not exist in the cache; and
copying the source block of data from the source storage to the cache, wherein the source block of data is retrieved from the cache.

5. The method of claim 1, further comprising:
determining whether the target block of data was read from the source storage based on the marking.

6. The method of claim 1, further comprising:
determining that a warm start has occurred;
identifying one or more target blocks of data marked as read from the source storage; and
demoting the identified one or more target blocks of data.

7. The method of claim 1, further comprising:
determining that a failover has occurred;
identifying one or more target blocks of data marked as read from the source storage; and
demoting the identified one or more target blocks of data.

* * * * *